(12) United States Patent
Erickson et al.

(10) Patent No.: US 9,901,432 B2
(45) Date of Patent: Feb. 27, 2018

(54) FOURTH TOE PROCESSING SYSTEMS AND METHODS

(71) Applicant: NOVA-TECH ENGINEERING, LLC, Willmar, MN (US)

(72) Inventors: Matthew Henry Erickson, Willmar, MN (US); Wade Dayle Werder, New London, MN (US); Dana Mathew Molenaar, Pennock, MN (US)

(73) Assignee: Nova-Tech Engineering, LLC, Willmar, MN (US)

( * ) Notice: Subject to any disclaimer, the term of this patent is extended or adjusted under 35 U.S.C. 154(b) by 0 days.

(21) Appl. No.: 15/609,580

(22) Filed: May 31, 2017

(65) Prior Publication Data
US 2017/0265979 A1  Sep. 21, 2017

Related U.S. Application Data

(63) Continuation of application No. 13/142,997, filed as application No. PCT/US2010/021901 on Jan. 23, 2010, now Pat. No. 9,775,695.

(60) Provisional application No. 61/146,732, filed on Jan. 23, 2009, provisional application No. 61/146,737, filed on Jan. 23, 2009.

(51) Int. Cl.
| | |
|---|---|
| *A01K 37/00* | (2006.01) |
| *A22C 18/00* | (2006.01) |
| *A22C 25/00* | (2006.01) |
| *A61D 1/00* | (2006.01) |
| *A61D 3/00* | (2006.01) |

(52) U.S. Cl.
CPC ........ *A61D 1/005* (2013.01); *A61D 2003/006* (2013.01)

(58) Field of Classification Search
USPC .................. 119/713, 716; 452/166, 167, 154; 606/164, 163
See application file for complete search history.

(56) References Cited

U.S. PATENT DOCUMENTS

| | | | |
|---|---|---|---|
| 2,107,484 A | 2/1938 | Lesher | |
| 3,755,854 A | 9/1973 | Van Mil | |
| 3,882,570 A | 5/1975 | Zwiep et al. | |
| 3,925,847 A | 12/1975 | Leander et al. | |
| 4,343,309 A * | 8/1982 | DuBose ................ | A61B 18/12 606/164 |
| 4,343,310 A * | 8/1982 | DuBose ................ | A61B 18/12 606/164 |
| 4,354,297 A | 10/1982 | Wilson et al. | |
| 4,457,048 A | 7/1984 | Dreves | |
| 4,709,448 A | 12/1987 | McGuire et al. | |

(Continued)

FOREIGN PATENT DOCUMENTS

| | | |
|---|---|---|
| FR | 2 848 410 A1 | 6/2004 |
| WO | WO 2010/085718 | 7/2010 |

OTHER PUBLICATIONS

International Search Report and Written Opinion issued in the PCT dated Jul. 23, 2010 for PCT/US2010/021901; 11 pgs.

(Continued)

*Primary Examiner* — Andrea Valenti
(74) *Attorney, Agent, or Firm* — Mueting, Raasch & Gebhardt, P.A.

(57) ABSTRACT

Fourth toe processing apparatus and methods for the processing the fourth toes of a bird are disclosed.

18 Claims, 5 Drawing Sheets

(56) References Cited

U.S. PATENT DOCUMENTS

| | | | |
|---|---|---|---|
| 5,195,925 | A | 3/1993 | Gorans |
| 5,248,277 | A | 9/1993 | Bos et al. |
| 5,651,731 | A | 7/1997 | Gorans et al. |
| 6,461,232 | B1 | 10/2002 | Gwyther |
| 7,066,112 | B2 | 6/2006 | Gorans |
| 7,232,450 | B2 | 6/2007 | Gorans et al. |
| 7,363,881 | B2 | 4/2008 | Gorans et al. |
| 2002/0102934 | A1 | 8/2002 | Gwyther |
| 2005/0101937 | A1 | 5/2005 | Gorans et al. |
| 2011/0313409 | A1 | 12/2011 | Erickson et al. |
| 2012/0012070 | A1 | 1/2012 | Gorans et al. |

OTHER PUBLICATIONS

International Preliminary Report on Patentability issued in the PCT dated Jul. 26, 2011 for PCT/US2010/021901; 7 pgs.

* cited by examiner

FOURTH TOE PROCESSING SYSTEMS AND METHODS

RELATED APPLICATION

The present application is a continuation application of U.S. patent application Ser. No. 13/142,997, filed Sep. 8, 2011, which is the § 371 U.S. National Stage of International Application No. PCT/US2010/021901, filed 23 Jan. 2010, which claims the benefit under 35 U.S.C. § 119 of U.S. Provisional Patent Application No. 61/146,737 and U.S. Provisional Patent Application No. 61/146,732 both of which were filed on Jan. 23, 2009 and which is hereby incorporated by reference in its entirety.

Systems and methods for removing and/or retarding the growth of fourth toes on birds/poultry are described herein.

The processing of poultry may include activities such as sexing to determine gender, inoculating or otherwise medicating the birds, feeding the birds, weighing the birds, treating the beaks and/or claws of the birds (to, e.g., retard their growth), etc. Conventionally, birds are handled manually, i.e., individuals must physically hold the bird and either perform the process while holding the bird or load the bird into equipment in which one of the processes is performed.

In many cases, the birds may be restrained by their heads as described in, e.g., U.S. Pat. No. 5,651,731 (Gorans et al.) with the remainder of the bird being either manually restrained or unrestrained.

The fourth toe is an anatomical feature located on the shank of a bird, below the hock joint. In some instances, the fourth toe may alternatively be referred to as the "hallux claw." The remainder of the toes (other than the fourth toe) are attached to the distal end of the shank and are the digits upon which the bird stands, while the fourth toe or hallux claw is elevated on the shank above the toes used to support the bird.

Treatment of the fourth toes on birds is preferably accomplished as described herein using one or more non-contact energy sources to direct energy onto the fourth toe such that its growth is retarded. It may be preferred that the treatment include delivery of energy to the fourth toe in amounts sufficient to retard fourth toe growth, but that does not directly remove the fourth toe (although the fourth toe may eventually separate from the bird after treatment due to, e.g., tissue necrosis).

In one aspect, some embodiments of the fourth toe processing apparatus described may include a shield comprising a first side and a second side; a non-contact energy source emitting energy towards the first side of the shield; a shank restraint structure proximate the second side of the shield, the shank restraint structure capable of receiving a shank of a bird located proximate the second side of the shield; and a fourth toe aperture extending through the first side and the second side of the shield, such that energy emitted towards the first side of the shield by the energy source passes through the fourth toe aperture in the absence of an obstruction located in the fourth toe aperture, whereby a fourth toe of a bird having its shank positioned in the fourth toe aperture is exposed to the energy. In some embodiments, the non-contact energy source is selected from the group consisting of: an electromagnetic energy source, a heated fluid source, a laser, and a bulb.

In some embodiments of the apparatus described herein, the shield blocks energy emitted by the non-contact energy source from portions of the shank that are not exposed in the fourth toe aperture.

In some embodiments of the apparatus described herein, the shank restraint structure comprises a channel formed in the second side of the shield, wherein the fourth toe aperture is located in the channel.

In some embodiments of the apparatus described herein, a pair of shank restraint structures are provided in the shield.

In some embodiments of the apparatus described herein, a pair of shank restraint structures are provided in the shield, each of the shank restraint structures comprising a channel formed in the second side of the shield, and wherein each channel comprises a fourth toe aperture located therein.

In some embodiments of the apparatus described herein, each shank restraint structure comprises a suction opening, wherein suction can be delivered to retain a bird shank in the shank restraint structure. In some embodiments, each suction opening comprises a slot formed in the shield. In some embodiments, a suction source in fluid communication with the suction opening may be provided, whereby a shank of a bird located within the shank restraint apparatus can be retained with the shank restraint structure by suction forces.

In some embodiments of the apparatus described herein, the apparatus includes a poultry carrier that atraumatically restrains a live bird, wherein the poultry carrier comprises a torso support element shaped to support and atraumatically retain the torso of a live bird restrained in the carrier, and a leg clamp apparatus operably attached to the torso support element, the leg clamp apparatus positioned to receive and atraumatically retain a thigh of a live bird restrained in the carrier; wherein the torso support element is pivotally attached to a base such that the torso support element can be rotated relative the base about an axis of rotation; and wherein the torso support element and the base define an upright configuration and an inverted configuration, wherein rotation of the torso support element about the axis of rotation moves the torso support element between the upright configuration and the inverted configuration, wherein in the inverted configuration the leg clamp apparatus is located closer to the shield than when the torso support element is in the upright configuration. In some embodiments, each shank restraint structure comprises a suction opening, wherein suction can be delivered to retain a bird shank in the shank restraint structure. In some embodiments, each suction opening comprises a slot formed in the shield. In some embodiments, a suction source in fluid communication with the suction opening, whereby a shank of a bird located within the shank restraint apparatus can be retained with the shank restraint structure by suction forces.

In some embodiments using a poultry carrier, the leg clamp apparatus is configured to receive and retain both the thigh of the left leg and the thigh of the right leg of the bird restrained in the carrier apparatus. A pair of shank restraint structures may be provided in the shield, each of the shank restraint structures comprising a channel formed in the second side of the shield, wherein each channel comprises a fourth toe aperture located therein, and further wherein a distance between the right and left shanks of a bird restrained in the carrier apparatus is matched with a distance between the channels.

In another aspect, methods of processing a fourth toe on a bird are described herein, the methods including positioning a shank of a bird in a shank restraint structure proximate a second side of a shield that comprises first and second sides; locating the fourth toe on the shank of the bird in a fourth toe aperture that extends through the first and second sides of the shield such that the fourth toe in the fourth toe aperture is exposed on the first side of the shield; emitting non-contact energy towards the first side of the shield, wherein at least a portion of the non-contact energy is incident on the fourth tow located in the fourth toe aperture.

In some methods as described herein, the shank restraint structure comprises a channel formed in the second side of the shield and the fourth toe aperture is located in the channel, and further wherein the positioning comprises placing the shank of the bird in the channel such that the fourth toe on the shank is located in the fourth toe aperture.

In some methods as described herein, the shank restraint structure comprises a suction opening, and wherein the method further comprises drawing a suction on the suction opening to assist retention of the shank in the shank restraint structure.

In some methods as described herein, the method further comprises atraumatically restraining the bird in a poultry carrier that comprises a torso support element shaped to support and atraumatically retain the torso of a live bird restrained in the carrier, and a leg clamp apparatus operably attached to the torso support element, wherein the leg clamp apparatus receives and atraumatically retains a thigh of the bird, wherein the torso support element is pivotally attached to a base such that the torso support element and the leg clamp apparatus can be rotated relative to the base about an axis of rotation; and rotating the bird in the poultry carrier from an upright configuration to an inverted configuration, wherein in the inverted configuration the leg clamp apparatus is located closer to the shield than when the torso support element is in the upright configuration. The rotating may be performed before, after, or at the same time as the shank of the bird is positioned in the shank restraint structure.

As used in connection with the present invention, a "non-contact energy source" means an energy source that is capable of heating the fourth toe and its associated tissue without physical contact of a solid object such as a heated wire, heated blade, etc. Examples of suitable non-contact energy sources may include, but are not limited to, lasers, bulbs emitting electromagnetic (e.g., infrared) radiation, heated fluids, etc.

Although the systems and methods described herein may be used with birds of any age, they me particularly useful when used with hatchlings, where "hatchlings" are defined as young birds (e.g., chickens, turkeys, ducks, geese, etc.) with an age of one week or less.

The fourth toe processing systems may be used in a stand-alone environment in which each bird is manually loaded into the apparatus, which is then activated to treat the fourth toe. Alternatively, the fourth toe processing apparatus may be used in a more automated processing system, such as those described in, e.g., U.S. Pat. No. 7,066,112, titled AUTOMATED POULTRY PROCESSING METHOD AND SYSTEM. In such automated systems, the fourth toe processing apparatus may be provided as a functional station.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. The term "and/or" means one or all of the listed elements or a combination of any two or more of the listed elements.

The above discussion is not intended to describe each embodiment or every implementation of the apparatus, systems and methods described herein. Rather, a more complete understanding of the invention will become apparent and appreciated by reference to the following Description of Exemplary Embodiments and claims in view of the accompanying figures of the drawing.

BRIEF DESCRIPTION OF THE VIEWS OF THE DRAWING

The present invention will be further described with reference to the views of the drawing, wherein.

DESCRIPTION OF EXEMPLARY EMBODIMENTS

Figure 1:
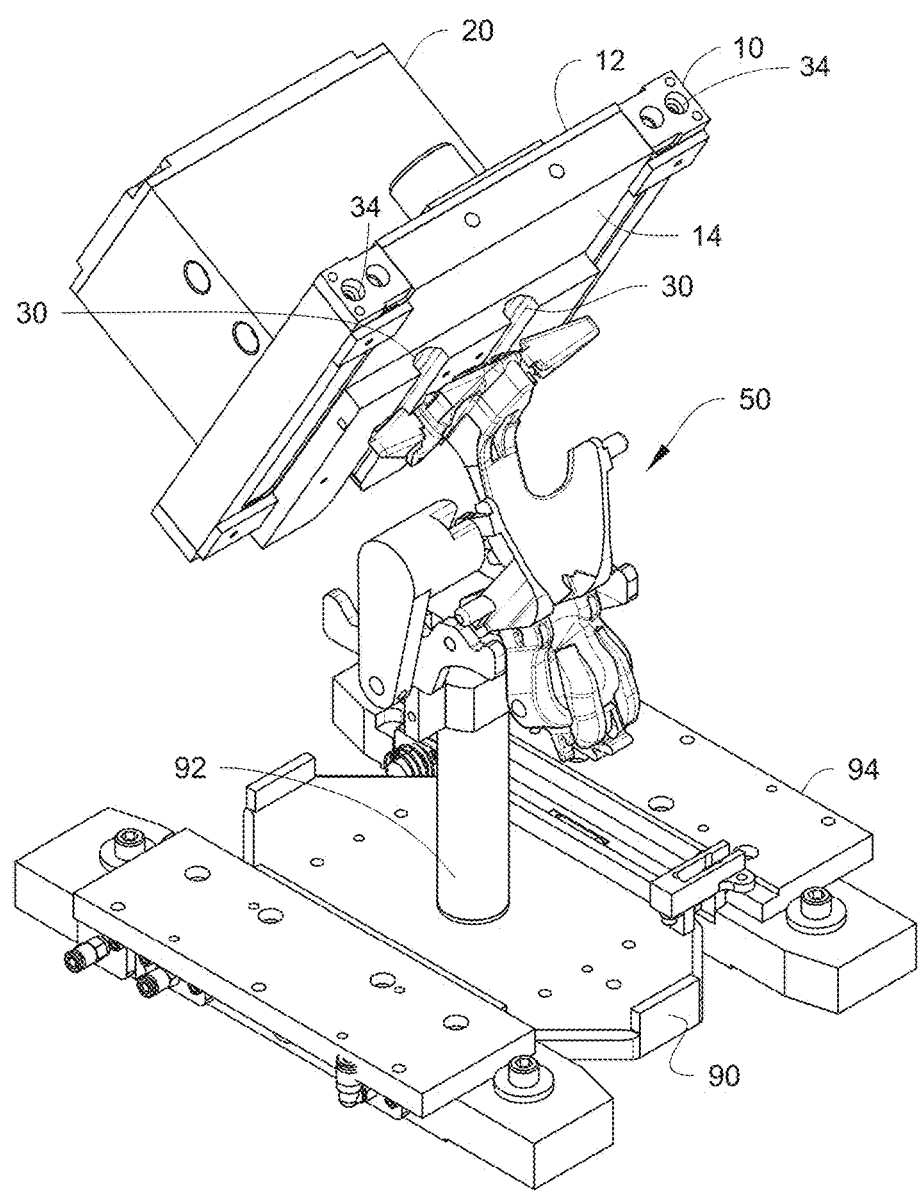
FIG. 1 is a perspective view of one exemplary embodiment of a fourth toe processing apparatus in use with a poultry carrier.

In the following detailed description of exemplary embodiments, reference is made to the accompanying figures of the drawing which form a part hereof, and in which are shown, by way of illustration, specific embodiments in which apparatus, systems, and methods described herein may be practiced. It is to be understood that other embodiments may be utilized and structural changes may be made without departing from the scope of the present invention.

Figure 2:
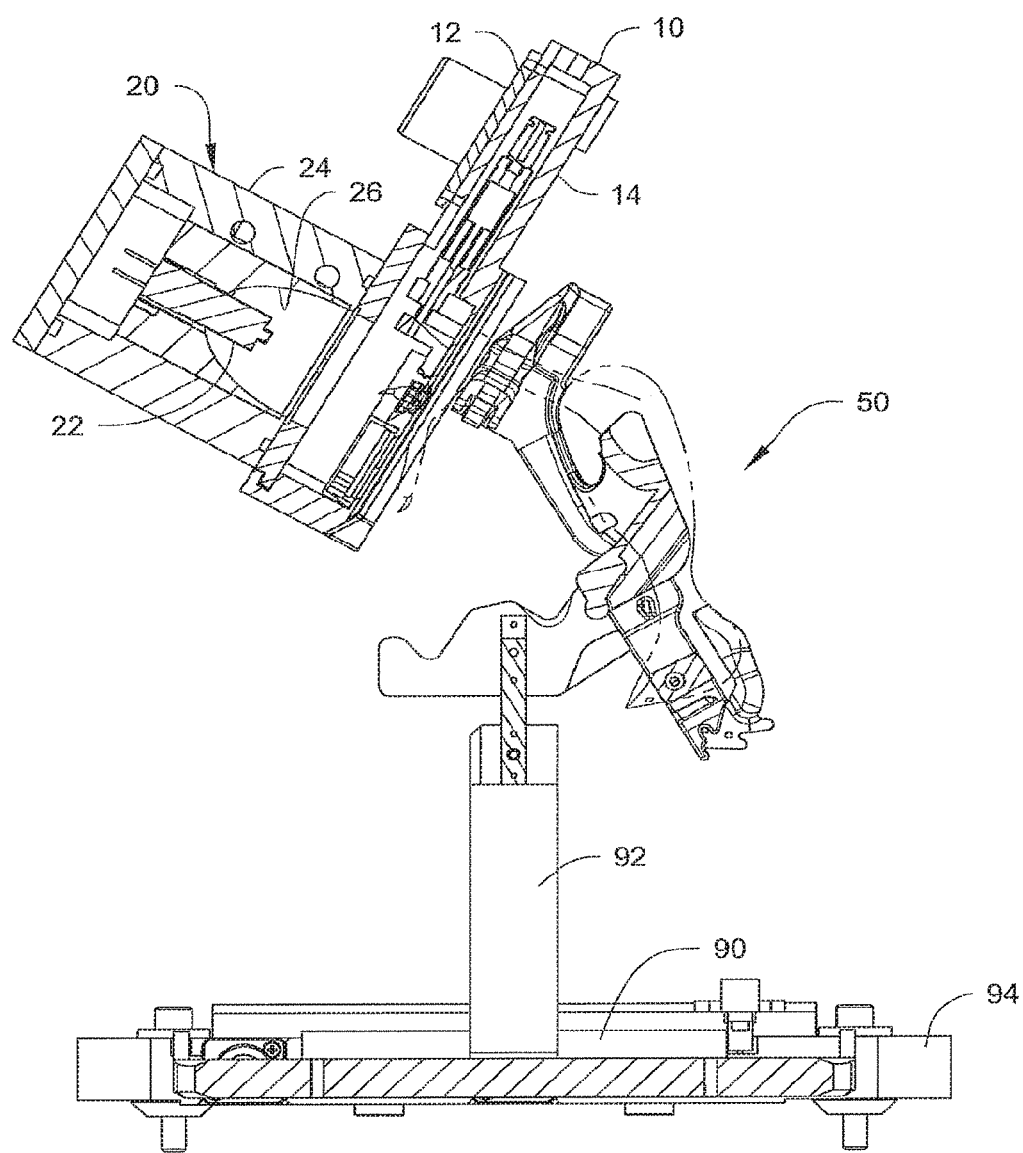
FIG. 2 is a side elevational view of the apparatus of FIG. 1 including a bird restrained in the poultry carrier, wherein the shield and the energy source are depicted in cross-section.
Figure 3:
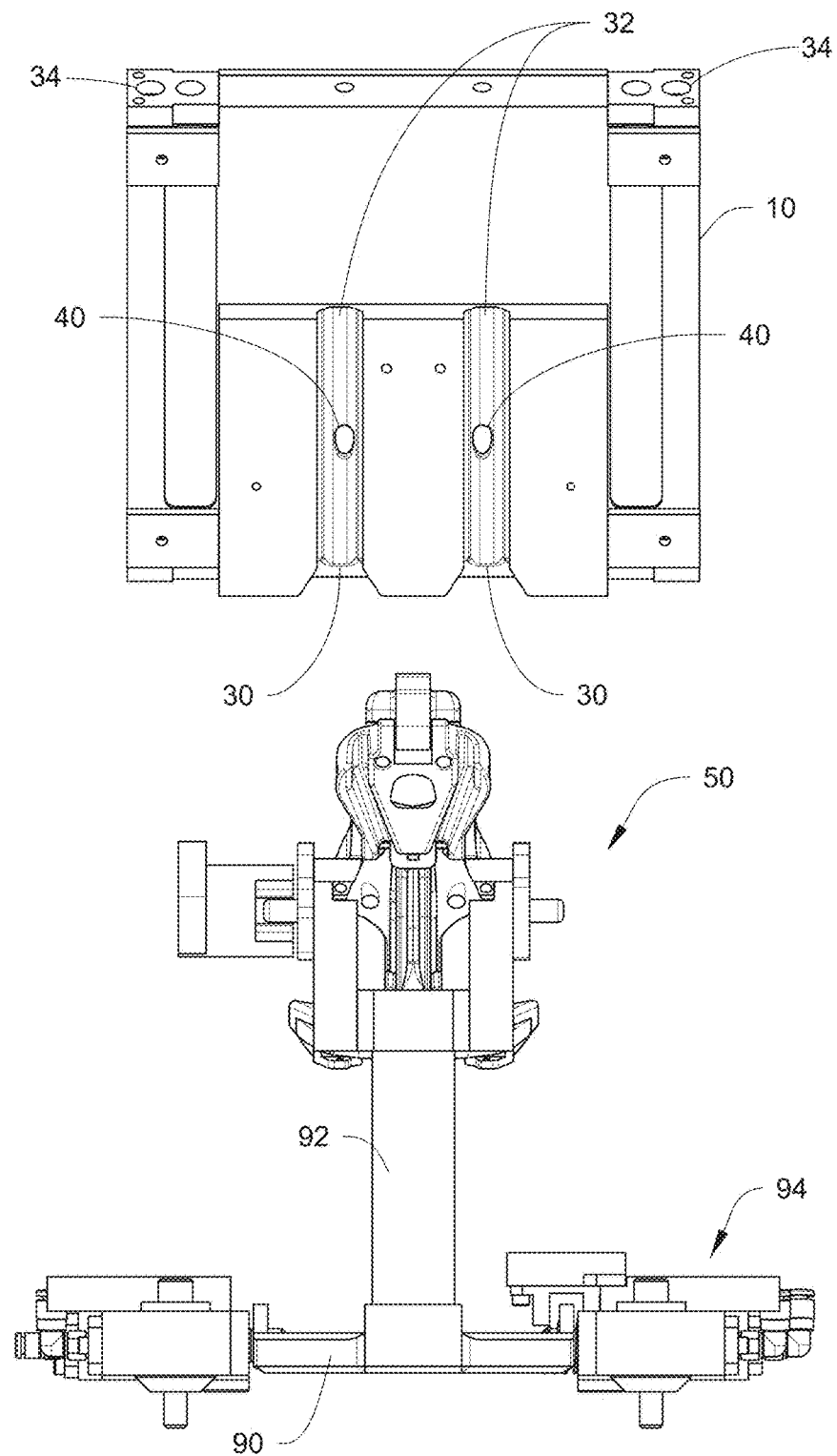
FIG. 3 is an exploded front elevational view of the fourth toe processing apparatus including a poultry carrier located below the fourth toe processing apparatus.

One exemplary embodiment of a fourth toe processing apparatus is depicted in the perspective view of FIG. 1, the side view of in FIG. 2, and the exploded front view of FIG. 3.

Although the fourth toe processing apparatus 10 is depicted in connection with a poultry carrier 50, it should be understood that the fourth toe processing apparatus 10 may be used without the depicted poultry carrier, e.g., a different poultry carrier may be used, no poultry carrier may be used, etc.

Referring to FIGS. 1-3, the fourth toe processing apparatus preferably includes a shield 10 having a first side 12 and a second side 14. The apparatus further includes a non-contact energy source 20 emitting energy towards the first side 12 of the shield 10. One or more shank restraint structures 30 are provided proximate the second side 14 of the shield 10. The shank restraint structure 30 is preferably capable of receiving a shank of a bird located proximate the second side 14 of the shield 10 (as depicted in, e.g., FIG. 2). Although the depicted embodiment includes a pair of shank restraint structures, the apparatus may, in some embodiments, include only one shank restrain structure.

A fourth toe aperture 40 extends through the first side 12 and the second side 14 of the shield 10 such that energy emitted towards the first side 12 of the shield 10 by the energy source 20 passes through the fourth toe aperture 40 in the absence of an obstruction located in the fourth toe aperture 40. For example, if the fourth toe of a bird is positioned in the fourth toe aperture 40, it would be exposed to energy incident on the first side 12 of the shield 10.

The shield 10 is preferably opaque to the energy emitted by the non-contact energy source 20, such that the energy emitted by the source 20 is incident only on the portions of the bird exposed within the fourth toe apertures 40. In other words, the shield 10 preferably shields or protects the bird from the energy emitted from source 20.

Although the shank restrain structures used in connection with the fourth toe processing apparatus may take many different forms, e.g., clamps, tubes, posts, etc. In the depicted embodiment, the shank restraint structure 30 includes a channel formed in the shield 10. The channel may preferably be sized to receive a significant portion of the shank of a bird such that the shank is at least partially restrained from movement. The channel may include slots or other features that are adapted to guide the fourth toes into the fourth toe apertures 40.

The shank restraint structure 30 may include one or more suction openings 32, wherein suction can be delivered to retain a bird shank in the shank restraint structure 30 by connecting a suction device (e.g., pump, bladder, etc.) to the suction openings. The suction openings 32 may take any suitable form or shape, e.g., slots, circles, etc. In the embodiment as depicted in FIG. 3, each shank restraint structure 30 includes two slots as suction openings 32.

In some embodiments, the shield 10 may include one or more passageways formed therein, wherein the passageways are in fluid communication with the suction openings 32. The passageways may extend through the shield 10 to a suction port 34 (seen in FIGS. 1 and 3) on the shield, whereby a suction source can be placed in fluid communication with the suction opening 32 through the passageway in the shield 10 connecting the suction source to suction ports 34.

As depicted, it may be preferred that the apparatus include two shank restraint structures, wherein each shank restraint structure includes a fourth toe aperture so that energy can be delivered to the fourth toes on both legs at the same time if desired. Although the shank restraint structures 30 are in form of substantially parallel channels, the shank restraint structures need not necessarily retain the shanks in substantially parallel alignment with each other.

The fourth toe processing apparatus also includes a non-contact energy source 20. The depicted source 20 includes one or more bulbs 22 located in housing 24. The sources may further include reflectors 26 adapted to direct energy emitted by the bulbs 22 towards the fourth toe apertures 40. Although a bulb is depicted in FIG. 2, the non-contact energy sources 20 may take many different forms, e.g., any electromagnetic energy source, a heated fluid source (where, e.g., the heated fluid may be in the form of a gas), a laser, etc. In some embodiments, the apparatus may include two or more different non-contact energy sources such that two different types of non-contact energy can be delivered to the fourth toes, with the two types of energy being delivered at the same time and/or at different times.

In some embodiments, the fourth toe processing systems may be designed to interface with a bird restrained in a poultry carrier such as those described in, e.g., U.S. Provisional Patent Application Ser. No. 61/146,732, titled POULTRY CARRIERS AND METHODS OF TRANSPORTING POULTRY, filed on Jan. 23, 2009 and in PCT Patent Application PCT/US10/21900, titled POULTRY CARRIERS AND METHODS OF RESTRAINING POULTRY, filed on even date herewith.

The poultry carriers used in connection with the apparatus described herein may preferably atraumatically restrain a live bird. As used herein, the term "atraumatic restraint" (and variations thereof) means restraint that does not require puncturing the skin of the bird to restrain the bird.

One exemplary embodiment of a poultry carrier that may be used in connection with the apparatus and methods described herein is depicted in FIGS. 1-5. The poultry carrier 50 is operably supported above a base 90 by a post 92. The base 90 and support may be provided such that the poultry carrier 50 can be used with conveyors and other transport systems.

The depicted poultry carrier 50 also includes a torso support element 60, a leg clamp apparatus including one or more leg clamps 70 and an optional head support 80. The various components may be operably attached in a manner that provides for atraumatic restraint of a bird positioned in the poultry carrier 50.

In at least some embodiments, the torso support element 60 includes a support surface that is preferably shaped to generally follow the anatomical shape of the torso of a bird located in the poultry carrier 50. As a result, the shape of the support surface may be different depending on the breed, age, gender, etc. of the birds that are to be restrained in the poultry carrier 50.

The poultry carrier 50 may also include a leg clamp apparatus with one or more leg clamps 70 positioned to restrain the legs of a bird having its torso supported by the torso support element 60. The leg clamps 70 may preferably be positioned to retain the leg of a bird on the thigh at a location above the joint commonly referred to as the "hock" joint. The leg clamps 70 may include arms that move between open configurations in which the thighs of a bird can be positioned in the leg clamps and closed configurations in which the thighs of the bird are retained in the clamps 70. Although the depicted leg clamps 70 include arms, other structures (such as, e.g., inflatable bladders, etc.) may be used to retain a bird's thighs in the leg clamps when the clamps 70 are in the closed configuration.

The poultry carrier 50 may include separate leg clamps for each leg of a bird as in the depicted embodiment. Alternatively, the leg clamp apparatus may include a single leg clamp that is preferably capable of capturing and retaining at least one or preferably both legs of a bird. One potential advantage of separate leg clamps is that they may potentially be used independently of each other such that one leg of the bird may be restrained first, followed by capture of the other leg.

The leg clamps 70 may be normally closed, but constructed such that they open in response to the forces generated as a leg is being inserted into the leg clamp 70 (the leg clamps 70 may be spring-loaded, etc.). In other embodiments, the leg clamps 70 may have defined open and closed configurations between which the clamps can be moved to accept and/or retain a leg of a bird being restrained.

The poultry carrier 70 may also optionally include a leg separator positioned between the leg clamps 70. The leg separator may be used in connection with the leg clamps and the torso support element 60 to provide more accurate and repeatable positioning of the bird within the poultry carrier 50. The leg separator may also assist in positioning the legs of the bird to facilitate capture of the legs in the leg clamps 70.

The portion of the leg separator facing upwards towards the torso support 60 and head support 80 may preferably be concave such that the rump of a bird restrained in the carrier 50 nests into the leg separator to at least partially restrict movement of the restrained bird's rump side-to-side, i.e., in a direction extending between the leg clamps 70 in the depicted embodiment. The leg separator is in the form of an open loop, although in other embodiments, the leg separator may be formed of any structure that provides a concave cavity into which the rump of the bird may nest to restrict movement of the rump.

The poultry carriers 50 may also include a head support 80 operably attached to the torso support element 60 and positioned to support the head of a bird located in the poultry carrier 50. The head support 80 includes a first side facing the head of a bird retained in the carrier.

The head support 80 may include a head clamp movable between an open configuration and a closed configuration. In the open configuration, the head clamp is preferably positioned such that the head of a bird can be positioned in the head support 80. In the closed configuration, the head clamp preferably functions to retain the head of a bird in the head support 80. The head clamp may preferably extend far enough towards the legs of the bird such that it is capable of restraining the neck of the bird when the head clamp is in the closed configuration.

Structures similar to the head support 80 and related components may be described in, e.g., U.S. Pat. No. 5,651,731 titled METHOD AND APPARATUS FOR DEBEAKING POULTRY; U.S. Pat. No. 7,232,450 titled APPARATUS AND METHOD FOR UPPER AND LOWER BEAK TREATMENT; U.S. Patent Application Publication US 2005/0101937 A1 titled APPARATUS AND METHOD FOR NASAL DELIVERY OF COMPOSITIONS TO BIRDS; U.S. Pat. No. 7,363,881 titled BEAK TREATMENT WITH TONGUE PROTECTION; etc.

The poultry carrier 50 may include a base 90, with the torso support element 60 and the base 90 being operably attached to each other in a manner that allows the torso support element 60 to be moved between two or more different orientations or configurations relative to the base 90. In the depicted embodiment, the torso support element 60 is attached to the base 90 using a post 92 or other support structure, although other attachment structures may be used. The different orientations or configurations may provide for improved access to different portions of the bird's anatomy such that different procedures may be facilitated. In other words, a portion of a bird's anatomy may be more easily accessed if the bird is in one or more selected orientations.

Figure 4:
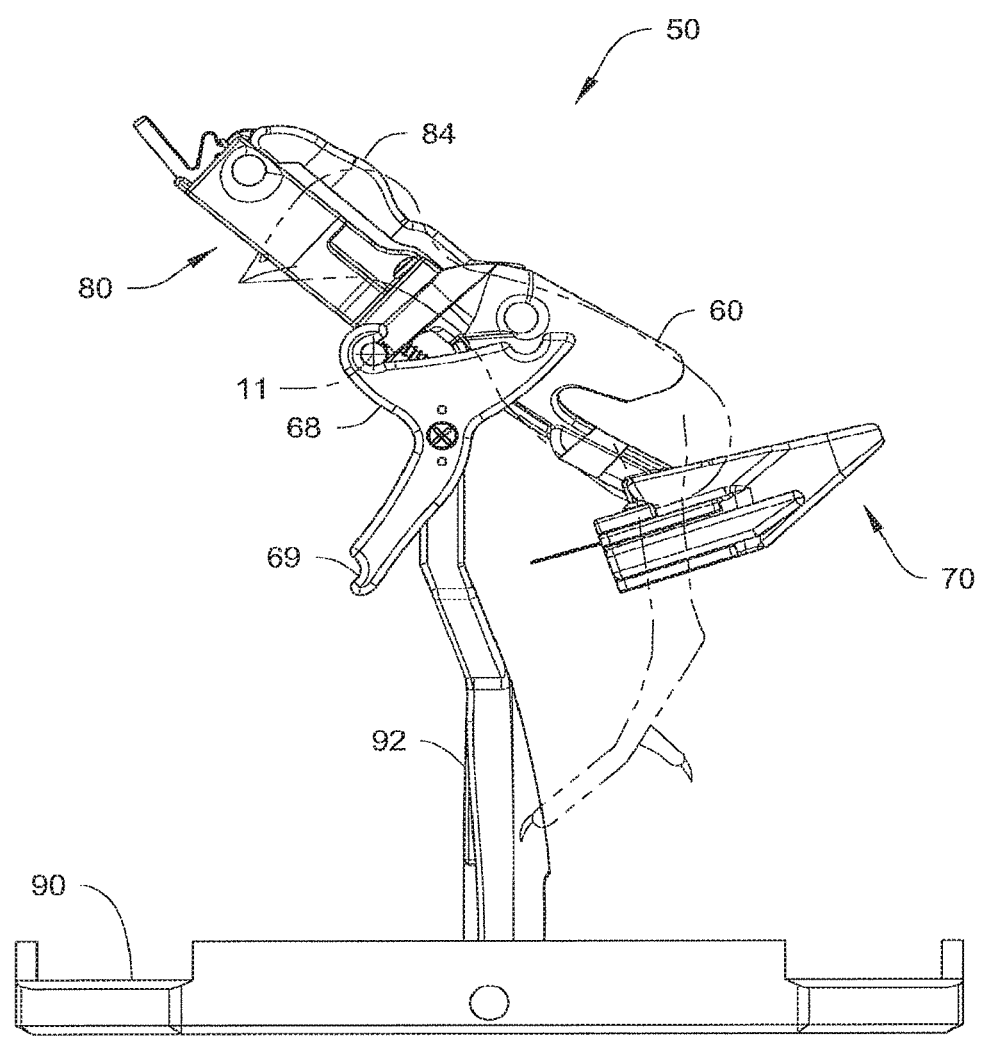
FIG. 4 is a side view of one embodiment of a poultry carrier, with a hatchling restrained therein in an upright orientation.
Figure 5:
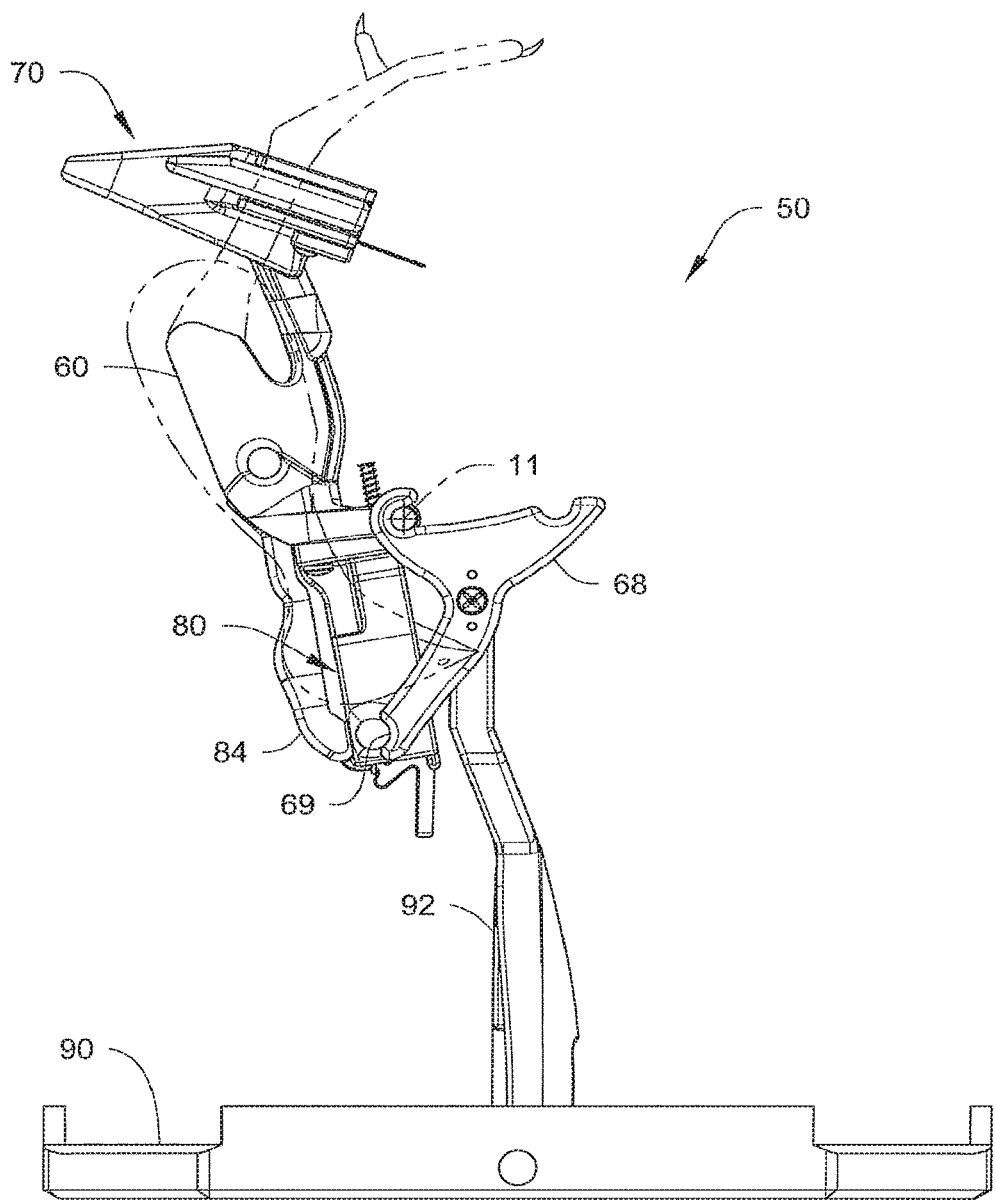
FIG. 5 is a side view of the poultry carrier of FIG. 4 in an inverted orientation.

The torso support element 60 can preferably move between and be held in, e.g., an upright configuration (as depicted in, e.g., FIGS. 3 and 4) and an inverted configuration (as depicted in, e.g., FIGS. 1, 2, and 5). Although these two configurations are depicted, other intermediate configurations may also be used (where, e.g., the bird is held in supine or prone position). Movement between the two configurations may be accomplished by e.g., rotating the torso support element 60 and the base 90 relative to each other. In the inverted configuration the leg clamp apparatus 70 is located closer to the shield 10 than when the torso support element 60 is in the upright configuration.

Movement of the torso support element 60 between the upright and inverted configurations may be accomplished, in some embodiments, by rotating the torso support element 60 and the base 90 relative to each other (although it may be typical to rotate the torso support element 60 while the base 90 remains relatively stationary). The carriers 50 may include torso support elements 60 that are designed to rotate about a wide variety of angles, e.g., horizontal axes, vertical axes, canted axes, etc. One potentially useful axis of rotation may include, e.g., axis 11 as seen in FIGS. 4 and 5.

Rotation of the torso support element 60 about axis 11 from the upright configuration to the inverted configuration may be limited in a first direction by a stop pin that protrudes from the torso support element 60. The stop pin may preferably act against a stop surface 69 on carriage 68 that supports the torso support element 60. Although rotation of the torso support element 60 is limited using a stop pin acting on stop surface 69, the stop pin and stop surface 69 represent only an example of the myriad of structures that could be used to control rotation of the torso support element 60.

Rotation of the poultry carrier 50 (and, thus, a bird restrained in the poultry carrier) may be useful in connection with the fourth toe apparatus described herein because it may be used to place the restrained bird's shanks in an orientation that allows for better and easier placement with respect to the shield 10 and the shank restraint features located thereon.

In addition, the leg clamp apparatus 70 of the poultry carrier 50 may preferably restrain a bird's legs such that the distance between the right and left shanks matches the distance between the shank restraint features (e.g., channels 30) of the apparatus described herein.

Methods of using the apparatus and systems described herein may include positioning a shank of a bird in a shank restraint structure proximate a second side of a shield that comprises first and second sides. The method may further include locating the fourth toe on the shank of the bird in a fourth toe aperture that extends through the first and second sides of the shield such that the fourth toe in the fourth toe aperture is exposed on the first side of the shield. Non-contact energy can be emitted towards the first side of the shield such that at least a portion of the non-contact energy is incident on the fourth tow located in the fourth toe aperture.

In some methods described herein, the shank restraint structure comprises a channel formed in the second side of the shield and the fourth toe aperture is located in the channel as described herein. The positioning may involve placing the shank of the bird in the channel of the shank restraint structure such that the fourth toe on the shank is located in the fourth toe aperture as described herein (see, e.g., FIG. 2). If the shank restraint structure also include a suction opening as described here, the method may include drawing a suction on the suction opening to assist retention of the shank in the shank restraint structure (by the vacuum forces generated from the suction).

In methods that include the use of the optional poultry carriers described herein, the method may further include atraumatically restraining the bird in the poultry carrier that includes a torso support element and leg clamp apparatus as described herein to atraumatically restrain the torso and the legs of the bird. The torso support element may be pivotally attached to a base as described herein such that the torso support element and the leg clamp apparatus can be rotated relative to the base about an axis of rotation.

The method may further include rotating the bird in the poultry carrier from an upright configuration to an inverted configuration, wherein in the inverted configuration the leg clamp apparatus is located closer to the shield than when the torso support element is in the upright configuration. That rotation can provide better access to the bird's shanks. The rotating can be performed before or at the same time as the shank of the bird is positioned in the shank restraint structure.

The fourth toe processing apparatus may be manufactured of any suitable materials, e.g., metals, plastics, etc. In some instances, it may be beneficial if the materials have selected physical characteristics, such as, e.g., electrical conductivity, thermal conductivity, etc.

The complete disclosure of the patents, patent documents, and publications cited in the Background, the Detailed Description of Exemplary Embodiments, and elsewhere herein are incorporated by reference in their entirety as if each were individually incorporated.

Exemplary embodiments of this invention have been discussed and reference has been made to possible variations within the scope of this invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A method of processing a fourth toe on a bird, the method comprising:
    positioning a shank of a bird in a channel formed into a first side of a shield such that the shank is received in the channel;
    locating a fourth toe on the shank of the bird in a fourth toe aperture, wherein the fourth toe is located in the fourth toe aperture when the shank is received in the channel, and wherein the fourth toe aperture extends through the shield to a second side of the shield such that the fourth toe of the bird is exposed proximate the second side of the shield;
    restraining the shank of the bird received in the channel using suction delivered directly into the channel through a suction opening in the channel such that a suction force is applied directly to the shank through the suction opening in the channel, wherein a tip of the fourth toe is not directly exposed to any suction force when the fourth toe is located in the fourth toe aperture; and
    emitting energy from a non-contact energy source directly at the fourth toe aperture on the second side of the shield, wherein only the fourth toe of the bird having its shank in the channel is exposed to the energy.

2. A method according to claim 1, wherein the method comprises blocking the energy emitted by the non-contact energy source from portions of the shank of the bird in the channel that are not exposed in the fourth toe aperture.

3. A method according to claim 1, wherein the suction opening comprises a slot in the channel.

4. A method according to claim 1, wherein the suction delivered into the channel through the suction opening in the channel is delivered through a passageway extending through the shield.

5. A method according to claim 1, wherein the suction delivered into the channel through the suction opening in the channel is delivered through a passageway extending through the shield to a suction port on the shield.

6. A method according to claim 1, wherein the suction delivered into the channel through the suction opening in the channel is delivered through a passageway extending through the shield to a suction port positioned between the first side and the second side of the shield.

7. A method according to claim 1, wherein the non-contact energy source is selected from the group consisting of: an electromagnetic energy source, a heated fluid source, a laser, and a bulb.

8. A method according to claim 1, wherein the energy delivered to the fourth toe of the bird having its shank positioned in the channel is in an amount sufficient to retard growth of the fourth toe.

9. A method of processing a fourth toe on a bird, the method comprising:
    positioning a shank of a bird in a channel formed into a first side of a shield such that the shank is received in the channel;
    locating a fourth toe on the shank of the bird in a fourth toe aperture, wherein the fourth toe is located in the fourth toe aperture when the shank is received in the channel, and wherein the fourth toe aperture extends through the shield to a second side of the shield such that the fourth toe of the bird is exposed proximate the second side of the shield;
    restraining the shank of the bird received in the channel using suction delivered directly into the channel through a suction opening in the channel such that a suction force is applied directly to the shank through the suction opening in the channel, wherein a tip of the fourth toe is not directly exposed to any suction force when the fourth toe is located in the fourth toe aperture, wherein the suction opening comprises a slot in the channel and the suction delivered into the channel through the suction opening in the channel is delivered through a passageway extending through the shield to a suction port on the shield;
    emitting energy from a non-contact energy source directly at the fourth toe aperture on the second side of the shield;
    blocking the energy emitted by the non-contact energy source from portions of the shank of the bird in the channel that are not exposed in the fourth toe aperture;
    wherein only the fourth toe of the bird having its shank in the channel is exposed to the energy;
    and wherein the energy delivered to the fourth toe of the bird having its shank positioned in the channel is in an amount sufficient to retard growth of the fourth toe.

10. A method according to claim 9, wherein the non-contact energy source is selected from the group consisting of: an electromagnetic energy source, a heated fluid source, a laser, and a bulb.

11. A method of processing fourth toes on a bird, the method comprising:
    positioning a left shank of a bird in a left channel formed into a first side of a shield and a right shank of the bird in a right channel formed into the first side of the shield such that the left shank is received in the left channel and the right shank is received in the right channel;
    locating a left fourth toe on the left shank of the bird in a left fourth toe aperture in the left channel, wherein the left fourth toe is located in the fourth toe aperture when the left shank is received in the left channel, and wherein the left fourth toe aperture extends through the shield to a second side of the shield such that the left fourth toe of the bird is exposed proximate the second side of the shield;
    locating a right fourth toe on the right shank of the bird in a right fourth toe aperture in the right channel, wherein right fourth toe is located in the fourth toe aperture when the right shank is received in the right channel, and wherein the right fourth toe aperture extends through the shield to a second side of the shield such that the right fourth toe of the bird is exposed proximate the second side of the shield;
    restraining the left shank of the bird received in the left channel using suction delivered directly into the left channel through a left suction opening in the left channel such that a suction force is applied directly to the left shank through the suction opening in the left channel, wherein a tip of the left fourth toe is not directly exposed to any suction force when the left fourth toe is located in the left fourth toe aperture, restraining the right shank of the bird received in the right channel using suction delivered directly into the right channel through a right suction opening in the right channel such that a suction force is applied directly to the right shank through the suction opening in the right channel, wherein a tip of the right fourth toe is not directly exposed to any suction force when the right fourth toe is located in the right fourth toe aperture, emitting energy from a non-contact energy source directly at the left fourth toe aperture and the right fourth toe aperture on the second side of the shield, wherein only the left fourth toe and the right fourth toe of the bird having its left shank in the left channel and its right shank in the right channel are exposed to the energy.

12. A method according to claim 11, wherein the method comprises blocking the energy emitted by the non-contact energy source from portions of the left shank of the bird in the left channel that are not exposed in the left fourth toe aperture and blocking the energy emitted by the non-contact energy source from portions of the right shank of the bird in the right channel that are not exposed in the tight fourth toe aperture.

13. A method according to claim 11, wherein the left suction opening comprises a slot in the left channel, and wherein the right suction opening comprises a slot in the right channel.

14. A method according to claim 11, wherein the suction delivered into the left channel through the left suction opening in the left channel is delivered through a passageway extending through the shield.

15. A method according to claim 11, wherein the suction delivered into the left channel through the left suction opening in the left channel is delivered through a passageway extending through the shield to a suction port on the shield.

16. A method according to claim 11, wherein the suction delivered into the left channel through the left suction opening in the left channel is delivered through a passageway extending through the shield to a suction port positioned between the first side and the second side of the shield.

17. A method according to claim 11, wherein the non-contact energy source is selected from the group consisting of: an electromagnetic energy source, a heated fluid source, a laser, and a bulb.

18. A method according to claim 11, wherein the energy delivered to the left fourth toe of the bird having its left shank positioned in the left channel is in an amount sufficient to retard growth of the left fourth toe, and wherein the energy delivered to the right fourth toe of the bird having its right shank positioned in the right channel is in an amount sufficient to retard growth of the right fourth toe.

\* \* \* \* \*